United States Patent
Kosugi et al.

(10) Patent No.: US 10,278,259 B1
(45) Date of Patent: Apr. 30, 2019

(54) VEHICULAR LIGHTING DEVICE AND VEHICULAR LAMP

(71) Applicant: Toshiba Lighting & Technology Corporation, Yokosuka-shi, Kanagawa-ken (JP)

(72) Inventors: Daisuke Kosugi, Yokosuka (JP); Atsushi Heike, Yokosuka (JP)

(73) Assignee: Toshiba Lighting & Technology Corporation, Yokosuka-shi, Kanagawa-ken (JP)

(*) Notice: Subject to any disclaimer, the term of this patent is extended or adjusted under 35 U.S.C. 154(b) by 0 days.

(21) Appl. No.: 16/034,535

(22) Filed: Jul. 13, 2018

(30) Foreign Application Priority Data

Mar. 8, 2018 (JP) ................. 2018-041559

(51) Int. Cl.
| | |
|---|---|
| *H05B 33/08* | (2006.01) |
| *F21S 45/10* | (2018.01) |
| *F21S 43/19* | (2018.01) |
| *F21S 45/47* | (2018.01) |
| *F21S 45/50* | (2018.01) |

(52) U.S. Cl.
CPC .......... *H05B 33/089* (2013.01); *F21S 43/195* (2018.01); *F21S 45/10* (2018.01); *F21S 45/47* (2018.01); *F21S 45/50* (2018.01)

(58) Field of Classification Search
CPC ...... H05B 33/089; F21S 45/47; F21S 43/195; F21S 45/10; F21S 45/50
USPC .......................................................... 315/77
See application file for complete search history.

(56) References Cited

U.S. PATENT DOCUMENTS

| | | | | |
|---|---|---|---|---|
| 4,029,991 | A * | 6/1977 | Schultz ............. | H05B 33/0812 307/10.8 |
| 8,598,805 | B2 * | 12/2013 | Tremblay ............. | F21V 23/005 315/291 |
| 2006/0055245 | A1 * | 3/2006 | Ito ...................... | H05B 33/0812 307/10.8 |
| 2010/0270927 | A1 * | 10/2010 | Noyori ................ | F21V 23/0442 315/77 |
| 2016/0056336 | A1 * | 2/2016 | Hwang ................... | H01L 33/24 257/9 |
| 2016/0262231 | A1 * | 9/2016 | Iellina ................ | H05B 33/0827 |
| 2016/0290621 | A1 * | 10/2016 | Ozawa .................. | F21S 43/195 |
| 2017/0118818 | A1 * | 4/2017 | Tsuchiya .............. | B60Q 11/007 |
| 2017/0343180 | A1 * | 11/2017 | Ishiyama .............. | F21V 19/003 |

FOREIGN PATENT DOCUMENTS

JP          2009-272569 A       11/2009

* cited by examiner

*Primary Examiner* — Don P Le
(74) *Attorney, Agent, or Firm* — Banner & Witcoff, Ltd.

(57) ABSTRACT

According to one embodiment, a vehicular lighting device includes a socket, a substrate provided on one end side of the socket, at least one light emitting element provided on the substrate, a Zener diode provided on the substrate, and a controller provided on the substrate. The controller shuts off a current flowing through the light emitting element based on a voltage or a current on an anode side of the Zener diode.

15 Claims, 4 Drawing Sheets

VEHICULAR LIGHTING DEVICE AND VEHICULAR LAMP

CROSS-REFERENCE TO RELATED APPLICATIONS

This application is based upon and claims the benefit of priority from Japanese Patent Application No. 2018-041559, filed on Mar. 8, 2018; the entire contents of which are incorporated herein by reference.

FIELD

Embodiments described herein relate to a vehicular lighting device and a vehicular lamp.

BACKGROUND

From the viewpoints of power saving and prolonging the life, vehicular lighting devices equipped with light emitting diodes (LEDs) are becoming widespread.

The voltage applied to a vehicular lighting device fluctuates. Accordingly, in the vehicular lighting device, an operating voltage range (voltage fluctuation range) is defined.

However, if an electrical connection in a power supply circuit is temporarily disconnected due to vehicle vibration or repair works, an excessive voltage (surge voltage) exceeding the operating voltage range may be applied to the light emitting diode.

Consequently, a Zener diode is provided on an input side of the vehicular lighting device so that a voltage exceeding a predetermined voltage is not applied to the light emitting diode even if an excessive voltage is temporarily generated in the power supply circuit.

However, if a solution is merely that a constant voltage is made by the Zener diode, the Zener diode with high allowable power is required. The Zener diode with high allowable power increases in a size. As the size of the Zener diode increases, providing the Zener diode on a substrate on which the light emitting diode is mounted becomes difficult. In recent years, a downsized vehicular lighting device is demanded, and thus providing a large-sized Zener diode in the vehicular lighting device becomes further difficult.

Accordingly, a voltage clamping circuit having the Zener diode is generally provided on an output side of a power supply circuit that supplies electric power to the vehicular lighting device. However, in this configuration, a wiring between the Zener diode and the light emitting diode becomes long, and protection effect against the excessive voltage may be insufficient.

Therefore, development of a technology capable of improving the protection effect against the excessive voltage is desired.

DETAILED DESCRIPTION

Figure 1:
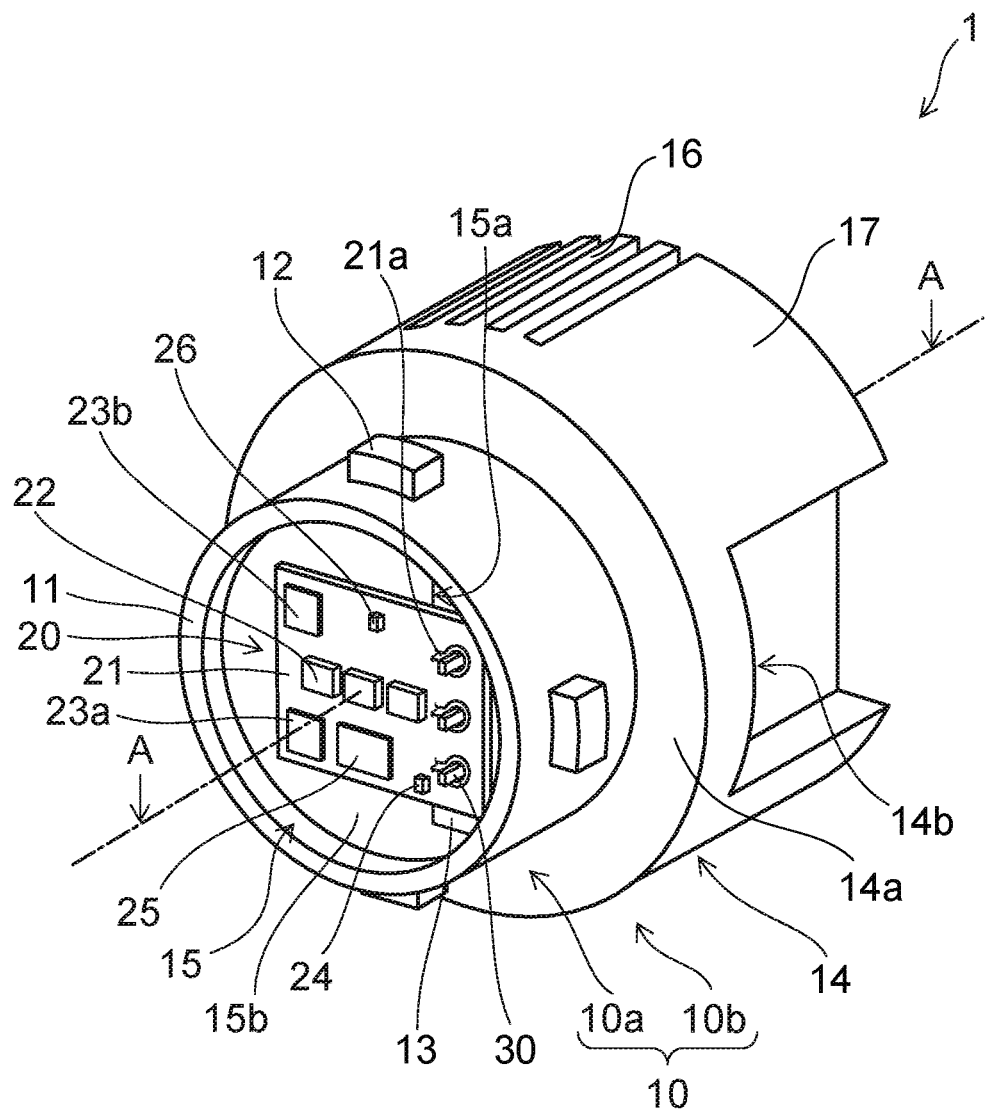
FIG. 1 is a schematic perspective view illustrating a vehicular lighting device according to an embodiment.

A vehicular lighting device according to an embodiment includes a socket, a substrate provided on one end side of the socket, at least one light emitting element provided on the substrate, a Zener diode provided on the substrate, and a controller provided on the substrate. The controller shuts off a current flowing through the light emitting element based on a voltage or a current on an anode side of the Zener diode.

Hereinafter, embodiments will be exemplified with reference to the drawings. In the drawings, the same components are denoted by the same reference numerals, and the detailed description will be omitted as appropriate.

A vehicular lighting device 1 according to the embodiment can be provided in, for example, an automobile, a railroad car, or the like. The exemplified vehicular lighting device 1 provided in the automobile is used in a front combination light (for example, appropriate combinations of any of a daytime running lamp (DRL), a position lamp, a turn signal lamp, and the like), a rear combination light (for example, appropriate combinations of any of a stop lamp, a tail lamp, a turn signal lamp, a back lamp, a fog lamp, etc., as appropriate), and the like. However, the use of the vehicular lighting device 1 is not limited to these examples.

FIG. 1 is a schematic perspective view illustrating a vehicular lighting device 1 according to the embodiment.

Figure 2:
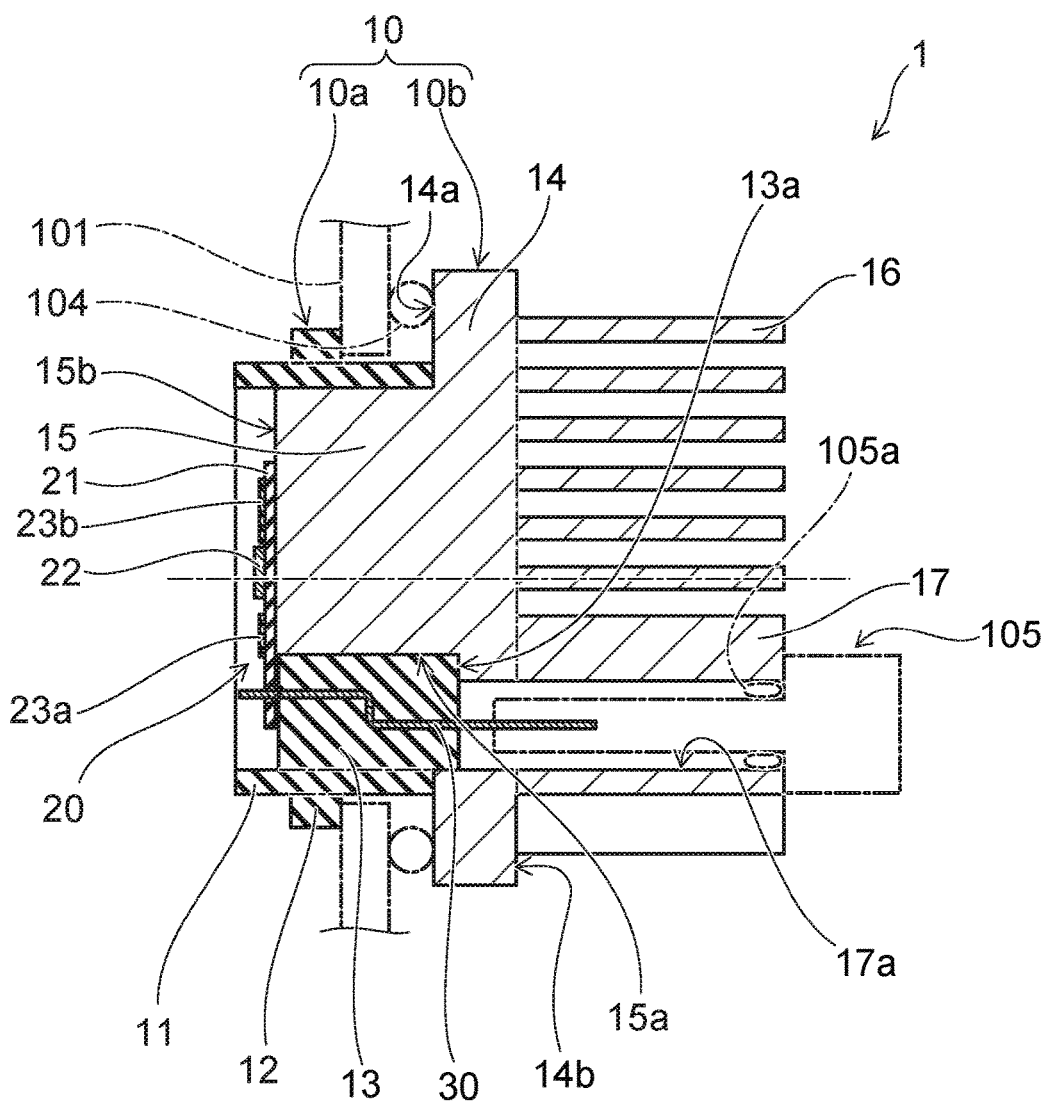
FIG. 2 is a schematic cross-sectional view in a direction of a line A-A of the vehicular lighting device.

FIG. 2 is a schematic cross-sectional view in a direction of a line A-A of the vehicular lighting device 1 in FIG. 1.

As shown in FIGS. 1 and 2, the vehicular lighting device 1 is provided with a socket 10, a light emitting module 20, and a power supply terminal 30.

The socket 10 has an accommodation portion 10a and a heat radiation portion 10b.

The accommodation portion 10a has a mounting portion 11, a bayonet 12, and an insulating portion 13.

The mounting portion 11 can be formed in, for example, a cylindrical shape. The mounting portion 11 is provided on a side of a flange 14 opposite to a side on which a heat radiation fin 16 is provided. The mounting portion 11 surrounds a mounting portion 15.

The bayonet 12 is provided on a side surface of the mounting portion 11 and protrudes toward the outside of the vehicular lighting device 1. A plurality of bayonets 12 are provided. The bayonet 12 is used when attaching the vehicular lighting device 1 to the vehicular lamp 100 by a twist lock. The insulating portion 13 is provided inside the mounting portion 11.

The accommodation portion 10a has a function of accommodating the light emitting module 20 and a function of insulating the power supply terminal 30. Consequently, the mounting portion 11, the bayonet 12, and the insulating portion 13 are preferably formed of an insulating material. The insulating material can be, for example, an organic material such as a resin, an inorganic material such as ceramics (for example, aluminum oxide, aluminum nitride, etc.), or the like.

The heat radiation portion 10b has the flange 14, the mounting portion 15, the heat radiation fin 16, and a convex portion 17.

The flange 14 can be formed in, for example, a disk. An outer side surface of the flange 14 is located outside the vehicular lighting device 1 further than an outer side surface of the bayonet 12.

The placing portion 15 can be formed in a cylindrical shape. The placing portion 15 is provided on a surface 14a of the flange 14 on the side opposite to the side on which the heat radiation fin 16 is provided. A concave portion 15a is provided on a side surface of the placing portion 15. The insulating portion 13 is provided inside the concave portion 15a. The light emitting module 20 (substrate 21) is provided on a surface 15b of the placing portion 15 on the side opposite to the flange 14 side.

The heat radiation fin 16 is provided on a surface 14b of the flange 14 opposite to the side on which the placing portion 15 is provided. A plurality of heat radiation fins 16 can be provided. The plurality of heat radiation fins 16 can be provided so as to be parallel to each other. The heat radiation fin 16 can be formed in a flat plate.

The convex portion 17 has a function of protecting an end of the power supply terminal 30 and a function of holding a connector 105. The convex portion 17 is provided on the surface 14b of the flange 14 on which the heat radiation fin 16 is provided. The convex portion 17 can be formed in a block shape. The convex portion 17 is provided with a hole 17a. The connector 105 with a seal member 105a is inserted into the hole 17a.

The heat radiation portion 10b has a function of placing the light emitting module 20 and a function of releasing heat generated in the light emitting module 20 to the outside. Consequently, in consideration of the function of releasing heat, the flange 14, the placing portion 15, the heat radiation fin 16, and the convex portion 17 are preferably formed of a material having a high thermal conductivity. Examples of the material include a metal such as aluminum or an aluminum alloy, a ceramic such as aluminum oxide or aluminum nitride, a high thermal conductive resin, or the like. The high thermal conductive resin is, for example, a resin such as PET (polyethylene terephthalate) or nylon mixed with a filler composed of aluminum oxide, carbon (carbon) or the like.

Furthermore, the heat radiation portion 10b is joined to the accommodation portion 10a. The accommodation portion 10a and the heat radiation portion 10b may be fitted together, or may be bonded using an adhesive or the like. Alternatively, the accommodation portion 10a and the heat radiation portion 10b may be joined by insert molding, or may be joined by heat welding.

The light emitting module 20 is provided on the surface 15b of the placing portion 15 on the side opposite to the flange 14 side.

The light emitting module 20 includes the substrate 21, a light emitting element 22, a resistor 23a, a resistor 23b (corresponding to an example of a first resistor), a diode 24, a controller 25, and a Zener diode 26.

The substrate 21 is provided on one end side of the socket 10. The substrate 21 is provided on the surface 15b of the placing portion 15. The substrate 21 has a flat plate shape. A wiring pattern 21a is provided on a surface of the substrate 21. Considering that the heat generated in the light emitting element 22 is efficiently transferred to the heat radiation portion 10b, the substrate 21 is preferably formed of a material having a high thermal conductivity. The material having a high thermal conductivity can be, for example, ceramics (for example, aluminum oxide or aluminum nitride), a metal plate whose surface is covered with an insulating material, or the like. Further, the substrate 21 may have a single layer structure or a multilayer structure.

The light emitting element 22 is provided on the substrate 21. At least one light emitting element 22 is provided. When a plurality of light emitting elements 22 are provided, the plurality of light emitting elements 22 are connected in series. The light emitting element 22 is electrically connected to the wiring pattern 21a provided on the surface of the substrate 21. The light emitting element 22 can be, for example, a light emitting diode, an organic light emitting diode, a laser diode, or the like.

The light emitting element 22 is not particularly limited to a specific type. The light emitting element 22 can be, for example, a surface-mounting type light emitting element such as a PLCC (Plastic Leaded Chip Carrier) type. The light emitting element 22 shown in FIGS. 1 and 2 is a surface-mounting type light emitting element.

The light emitting element 22 can also be, for example, a light emitting element having a lead wire such as a shell type.

In addition, the light emitting element 22 may be mounted by Chip-On-Board (COB) technique. When the light emitting element 22 is mounted by the COB technique, a chip-shaped light emitting element 22, a wiring for electrically connecting the light emitting element 22 and the wiring pattern 21a, a frame-like member surrounding the light emitting element 22 and the wiring, a sealing portion provided inside the frame-like member, and the like can be provided on the substrate 21. In this case, the sealing portion may include a phosphor. The phosphor can be, for example, an yttrium aluminum garnet (YAG) phosphor or the like. The type of the fluorescent substance is not limited to these examples. The type of the phosphor can be appropriately changed so as to obtain a desired luminescent color according to the use of the vehicular lighting device 1 or the like.

The resistors 23a and 23b are provided on the substrate 21. The resistors 23a and 23b are electrically connected to the wiring pattern 21a provided on the surface of the substrate 21.

The resistor 23a controls a current flowing through the light emitting element 22.

The forward voltage characteristics of the light emitting element 22 fluctuate. When the applied voltage between an anode terminal and a ground terminal is set to be constant, the brightness (luminous flux, luminance, luminosity, and illuminance) of the light emitting element 22 fluctuates. Consequently, a value of the current flowing through the light emitting element 22 falls within a predetermined range by the resistor 23a such that the brightness of the light emitting element 22 falls within a predetermined range. In this case, the value of the current flowing in the light emitting element 22 falls within a predetermined range by changing the resistance value of the resistor 23a.

The resistor 23b is connected in series with an anode of the Zener diode 26. The resistor 23b is provided to convert a current from the Zener diode 26 into a voltage and input the voltage to the controller 25. Accordingly, the voltage between the anode of the Zener diode 26 and the resistor 23b is input to the controller 25.

The resistors 23a and 23b can be, for example, a surface-mounting type resistor, a resistor with a lead wire (metal oxide film resistor), a film type resistor formed by a screen printing method, or the like.

The diode 24 is provided on the substrate 21. The diode 24 is electrically connected to the wiring pattern 21a provided on the surface of the substrate 21. The diode 24 is provided to prevent a reverse voltage from being applied to the light emitting element 22 and to prevent a pulse noise from a reverse direction from being applied to the light emitting element 22. The diode 24 can be, for example, a surface-mounting type diode, a diode with a lead wire, or the like.

The controller 25 is provided on the substrate 21. The controller 25 is electrically connected to the wiring pattern 21*a* provided on the surface of the substrate 21. Based on the voltage on the anode side of the Zener diode 26, the controller 25 shuts off the current flowing through the light emitting element 22. For example, when an excessive voltage is applied to the vehicular lighting device 1, a current flows through the Zener diode 26. The current flowing through the Zener diode 26 is converted into a voltage by the resistor 23*b*. When the converted voltage is applied to the controller 25, the controller 25 shuts off the current flowing through the light emitting element 22.

The controller 25 can be, for example, a field effect transistor (FET) or the like. When the controller 25 is the field effect transistor, a gate of the field effect transistor is electrically connected between the anode of the Zener diode 26 and the resistor 23*b*. In this case, a voltage between the anode of the Zener diode 26 and the resistor 23*b* is input to the gate of the field effect transistor.

The Zener diode 26 is provided on the substrate 21. The Zener diode 26 is electrically connected to the wiring pattern 21*a* provided on the surface of the substrate 21. The Zener diode 26 detects an excessive voltage applied to the vehicular lighting device 1. Details of the operation of the controller 25 and the Zener diode 26 will be described later.

At least one of the resistor 23*a*, the resistor 23*b*, the diode 24, the controller 25, and the Zener diode 26 can be provided on a surface (rear surface) of the substrate 21 on a side opposite to a side on which the light emitting element 22 is provided. That is, these elements may be provided on the substrate 21 on which the light emitting element 22 is provided. However, as long as these elements are provided on the surface of the substrate 21 on which the light emitting element 22 is provided, a contact area between the substrate 21 and the socket 10 increases such that the heat radiation property is enhanced. Further, since these elements can be mounted on the same side of the substrate 21, the manufacturing process can be simplified and the manufacturing cost can be reduced.

As will be described later, the Zener diode 26 can have a small size. Thus, these elements are easily mounted on the same side of the substrate 21.

In addition, a covering portion for covering the wiring pattern 21*a* and the film type resistor can be provided. The covering portion can include, for example, a glass material.

A plurality of power supply terminals 30 can be provided. The plurality of power supply terminals 30 are provided inside the socket 10 (insulating portion 13). One end of each of the power supply terminals 30 protrudes from an end surface of the insulating portion 13 on the opposite side to the flange 14 side and is electrically connected to the wiring pattern 21*a* provided on the substrate 21. The other end of each of the power supply terminals 30 protrudes from an end surface 13*a* on the flange 14 side of the insulating portion 13. The other end of each of the power supply terminals 30 is exposed inside the hole 17*a*. Those skilled in the art will appreciate that number, shape and the like of the power supply terminals 30 are not limited to those examples and can be changed as appropriate.

The operation of the controller 25 and the Zener diode 26 will be further described.

First, the operation of the controller 125 and the Zener diode 126 according to the comparative example will be described.

Figure 3:
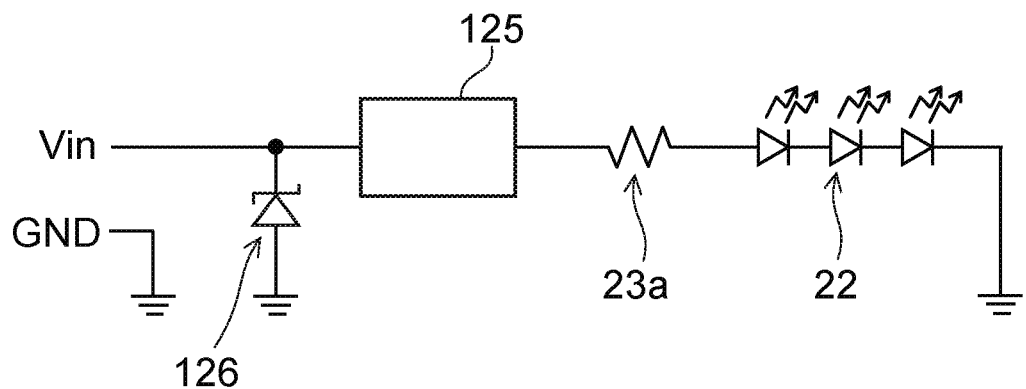
FIG. 3 is a circuit diagram illustrating an operation of a controller and a Zener diode according to a comparative example.

FIG. 3 is a circuit diagram illustrating the operation of the controller 125 and the Zener diode 126 according to the comparative example.

As shown in FIG. 3, the controller 125 is connected in series with the light emitting element 22. The controller 125 causes a current to flow through the light emitting element 22 or prevents a current from flowing through the light emitting element 22 based on a signal from a power supply circuit or the like which is provided outside the vehicular lighting device. That is, the controller 125 controls lighting-on and turning-off of the light emitting element 22. The controller 125 can be, for example, a switching element such as a transistor.

The Zener diode 126 is connected to an input side of the controller 125. When a predetermined voltage is applied to the vehicular lighting device, no current flows through the Zener diode 126. Consequently, a voltage applied to the vehicular lighting device is applied to the light emitting element 22 via the controller 125. On the other hand, when an excessive voltage is applied to the vehicular lighting device, a current flows through the Zener diode 126. Consequently, a voltage lower than the excessive voltage is applied to the light emitting element 22 via the controller 125. In this case, the voltage applied to the light emitting element 22 can be controlled by the Zener voltage (breakdown voltage). Accordingly, if the Zener diode 126 having an appropriate Zener voltage is selected according to the maximum rated value of the forward voltage of the light emitting element 22 or the like, the damage to the light emitting element 22 can be suppressed even when the excessive voltage is applied.

However, in this way, the Zener diode 126 having high allowable power is required. The Zener diode 126 with high allowable power increases in a size, thus providing the Zener diode 126 on the substrate 21 becomes difficult. In recent years, the downsized vehicular lighting device 1 is demanded, and thus providing the large-sized Zener diode 126 in the vehicular lighting device 1 becomes further difficult.

In this case, the Zener diode 126 can be provided on an output side of the power supply circuit that supplies power to the vehicular lighting device 1. However, when the Zener diode 126 is provided in the power supply circuit, a wiring between the Zener diode 126 and the light emitting element 22 becomes long, and protection effect against the excessive voltage may be insufficient.

Figure 4:
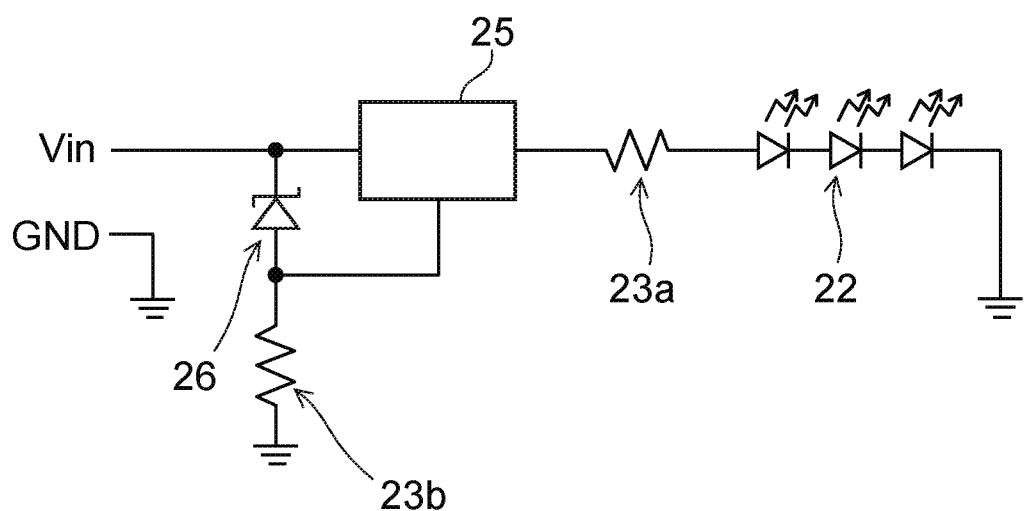
FIG. 4 is a circuit diagram illustrating an operation of a controller and a Zener diode according to the embodiment.

FIG. 4 is a circuit diagram illustrating the operation of the controller 25 and the Zener diode 26 according to the embodiment.

As shown in FIG. 4, the controller 25 is connected in series with the light emitting element 22. A cathode of the Zener diode 26 is electrically connected between an input terminal and an anode of the light emitting element 22. The controller 25 is electrically connected between the cathode of the Zener diode 26 and the anode of the light emitting element 22. The controller 25 causes a current to flow through the light emitting element 22 or prevents a current from flowing through the light emitting element 22 based on a signal (voltage) from the Zener diode 26. When a predetermined voltage is applied to the vehicular lighting device 1, no current flows through the Zener diode 26. Consequently, the controller 25 allows the voltage applied to the vehicular lighting device 1 to be applied to the light emitting element 22. On the other hand, when an excessive voltage is applied to the vehicular lighting device 1, a current flows through the Zener diode 26. The current flowing through the Zener diode 26 is converted into a voltage by the resistor 23b and is applied to the controller 25. When the voltage is applied to the controller 25, the controller 25 shuts off the current flowing through the light emitting element 22. For example, when the predetermined voltage is applied to the gate of the field effect transistor (controller 25), the field effect transistor (controller 25) shuts off the current flowing through the light emitting element 22. Consequently, when the excessive voltage is applied to the vehicular lighting device 1, no current flows through the light emitting element 22, so that damage to the light emitting element 22 can be suppressed.

That is, the Zener diode 26 detects the excessive voltage applied to the vehicular lighting device 1. A value of the voltage detectable by the Zener diode 26 can be appropriately changed depending on the Zener voltage. For example, the Zener diode 26 having an appropriate Zener voltage may be selected according to the maximum rated value of the forward voltage of the light emitting element 22 or the like. That is, the value of the detected voltage is determined by the Zener voltage of the Zener diode 26.

The required Zener voltage can be adjusted by changing the resistance value of the resistor 23b.

Unlike the Zener diode 126 according to the comparative example, the Zener diode 26 does not protect the light emitting element 22 by absorbing the excessive voltage applied to the vehicular lighting device 1. That is, the Zener diode 26 is provided to detect the excessive voltage applied to the vehicular lighting device 1. The Zener diode 26 detects the excessive voltage applied to the vehicular lighting device 1 and inputs the detection result to the controller 25. Therefore, the Zener diode 26 can have low allowable power. For example, the Zener diode 26 can have allowable power of 3 W or less.

Since the size of the Zener diode 26 having low allowable power is small, the Zener diode 26 can be mounted on the substrate 21 even if the vehicular lighting device 1 is downsized. If the Zener diode 26 is mounted on the substrate 21, the wiring between the Zener diode 26 and the light emitting element 22 can be shortened, so that the protection effect against an excessive voltage can be improved.

Figure 5:
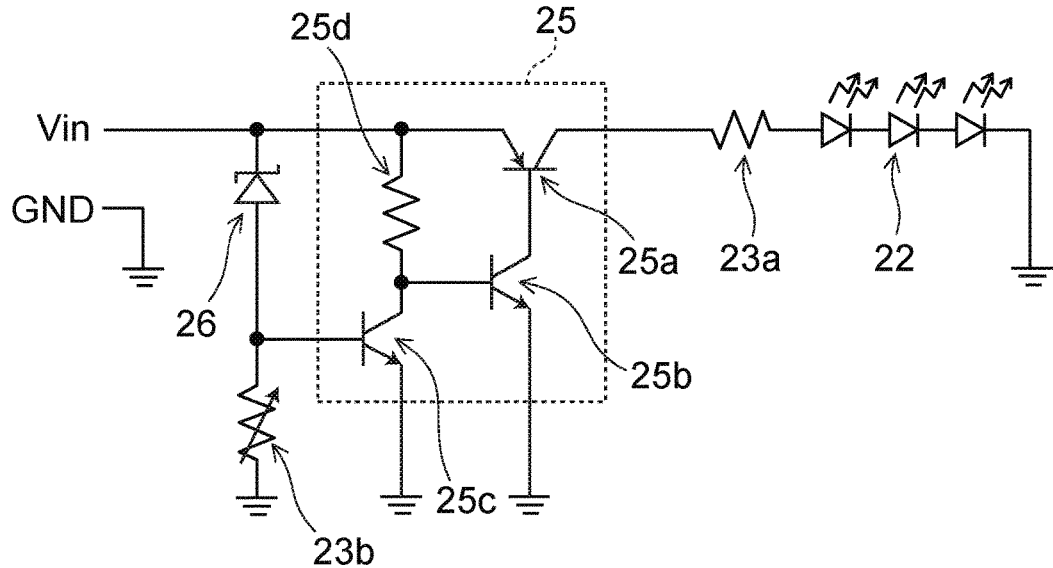
FIG. 5 is a circuit diagram illustrating a controller according to another embodiment.

FIG. 5 is a circuit diagram illustrating a controller 25 according to another embodiment.

As shown in FIG. 5, the controller 25 includes a bipolar transistor 25a (corresponding to an example of a first bipolar transistor), a bipolar transistor 25b (corresponding to an example of a second bipolar transistor), and a bipolar transistor 25c (corresponding to an example of a third bipolar transistor).

The bipolar transistor 25a controls supply and cease of the current for the light emitting element 22.

The bipolar transistors 25b and 25c control supply and cease of the current between the anode of the Zener diode 26 and the resistor 23b for a base of the bipolar transistor 25a. That is, the bipolar transistor 25c cooperates with the bipolar transistor 25b to control supply and cease of the current between the anode of the Zener diode 26 and the resistor 23b for the base of the bipolar transistor 25a.

For example, a collector of the bipolar transistor 25a is electrically connected to the light emitting element 22. A collector of the bipolar transistor 25b is electrically connected to the base of the bipolar transistor 25a. A base of the bipolar transistor 25b is electrically connected between a resistor 25d (corresponding to an example of a second resistor) and a collector of the bipolar transistor 25c. One end of the resistor 25d is electrically connected between the cathode of the Zener diode 26 and an emitter of the bipolar transistor 25a. The other end of the resistor 25d is electrically connected between the base of the bipolar transistor 25b and the collector of the bipolar transistor 25c. A base of the bipolar transistor 25c is electrically connected between the anode of the Zener diode 26 and the resistor 23b. In this case, the current between the anode of the Zener diode 26 and the resistor 23b is input to the base of the bipolar transistor 25b. As described above, when the excessive voltage is applied to the vehicular lighting device 1, a current flows through the Zener diode 26. Accordingly, the current is supplied to the base of the bipolar transistor 25c, the bipolar transistor 25c is turned on, and no current is supplied to the base of the bipolar transistor 25b via the resistor 25d. Therefore, the bipolar transistor 25b is turned off. As a result, the bipolar transistor 25a is turned off, and the current flowing through the light emitting element 22 is shut off. In this way, when the excessive voltage is applied to the vehicular lighting device 1, no current flows through the light emitting element 22, so that damage to the light emitting element 22 can be suppressed.

On the other hand, when the predetermined voltage is applied to the vehicular lighting device 1, no current flows through the Zener diode 26, so that no current is supplied to the base of the bipolar transistor 25c. Accordingly, the bipolar transistor 25c is turned off, and the current is supplied to the base of the bipolar transistor 25b via the resistor 25d. The bipolar transistor 25b is turned on, and thus the bipolar transistor 25a is also turned on. As a result, the current flows through the light emitting element 22, and light is emitted from the light emitting element 22.

Vehicular Lamp

Next, an exemplified vehicular lamp 100 will be described. Hereinafter, when the vehicular lamp 100 is a front combination light provided in an automobile will be described as an example. However, the vehicular lamp 100 is not limited to the front combination light provided in the automobile. The vehicular lamp 100 may be a vehicular lamp provided in an automobile, a railroad car, or the like.

Figure 6:
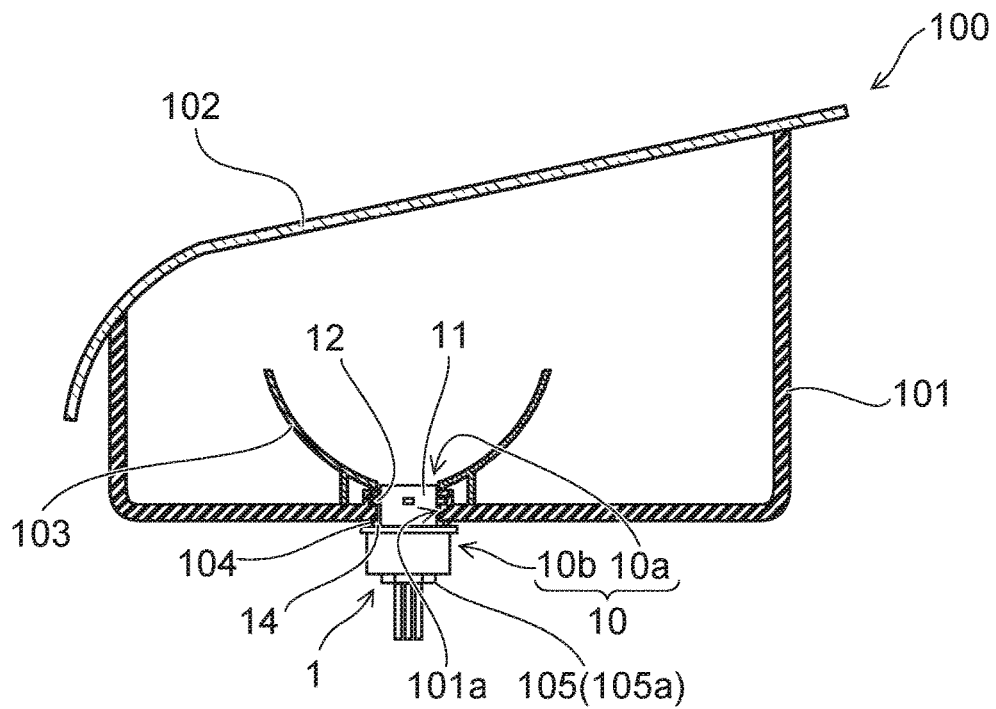
FIG. 6 is a schematic partial cross-sectional view illustrating a vehicular lamp.

FIG. 6 is a schematic partial cross-sectional view illustrating a vehicular lamp 100.

As shown in FIG. 6, the vehicular lamp 100 is provided with the vehicular lighting device 1, a housing 101, a cover 102, an optical element portion 103, a seal member 104, and a connector 105.

The housing 101 has a box-like shape with one end side opened. The housing 101 can be formed of, for example, a resin that does not transmit light. A mounting hole 101a, into which a portion of the mounting portion 11 where the bayonet 12 is provided, is provided on the bottom surface of the housing 101. A recessed portion, into which the bayonet 12 provided in the mounting portion 11 is inserted, is provided on a peripheral edge of the mounting hole 101a.

When the mounting hole 101a is directly provided in the housing 101 is exemplified, however, a mounting member having the mounting hole 101a may be provided in the housing 101.

When attaching the vehicular lighting device 1 to the vehicular lamp 100 (housing 101), the portion of the mounting portion 11 where the bayonet 12 is provided is inserted into the mounting hole 101a to rotate the vehicular lighting device 1. Accordingly, the bayonet 12 is held in the recess provided in the peripheral edge of the mounting hole 101a. Such a mounting method is called a twist lock.

The cover 102 is provided so as to close the opening of the housing 101. The cover 102 can be formed of a light-transmitting resin or the like. The cover 102 can have a function such as a lens.

Light emitted from the vehicular lighting device 1 is incident on the optical element portion 103. The optical element portion 103 performs reflection, diffusion, light guiding, condensation, formation of a predetermined light distribution pattern, and the like for the light emitted from the vehicular lighting device 1.

For example, the optical element portion 103 illustrated in FIG. 6 is a reflector. In this case, the optical element portion 103 reflects the light emitted from the vehicular lighting device 1 so as to form a predetermined light distribution pattern is formed.

The seal member 104 is provided between the flange 14 and the housing 101. The seal member 104 may be annular. The seal member 104 can be formed of an elastic material such as rubber or silicone resin.

The connector 105 is fitted to the end of each of the power supply terminals 30 exposed inside the hole 17a. A power supply (not shown) and the like are electrically connected to the connector 105. Consequently, the power supply (not shown) and the light emitting element 22 are electrically connected by fitting the connector 105 to the end of the power supply terminal 30.

The connector 105 is provided with a seal member 105a. The seal member 105a is provided to prevent water from entering into the hole 17a. When the connector 105 having the seal member 105a is inserted into the hole 17a, the hole 17a is sealed so as to be waterproof.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A vehicular lighting device, comprising:
a socket;
a substrate provided on one end side of the socket;
at least one light emitting element provided on the substrate;
a Zener diode provided on the substrate;
a first resistor provided on the substrate and connected in series with an anode of the Zener diode; and
a controller provided on the substrate and including a first bipolar transistor and a second bipolar transistor, the controller being configured to shut off a current flowing through the light emitting element based on a voltage or a current on an anode side of the Zener diode,
wherein a voltage or a current between the anode of the Zener diode and the first resistor is input to the controller,
the controller,
wherein the first bipolar transistor controls supply and cease of a current for the light emitting element, and
wherein the second bipolar transistor controls supply and cease of a current between the anode of the Zener diode and the first resistor for a base of the first bipolar transistor.

2. The device according to claim 1, wherein
a cathode of the Zener diode is electrically connected between an input terminal and an anode of the light emitting element, and
the controller is electrically connected to the cathode of the Zener diode and the anode of the light emitting element.

3. The device according to claim 1, wherein
the Zener diode detects an excessive voltage applied to the vehicular lighting device, and inputs a detection result to the controller.

4. The device according to claim 3, wherein
the Zener diode has allowable power of 3 W or less.

5. The device according to claim 3, wherein
a value of the voltage detectable by the Zener diode is determined by a voltage of the Zener diode.

6. The device according to claim 1, wherein
the current between the anode of the Zener diode and the first resistor is input to a base of the second bipolar transistor.

7. The device according to claim 1, wherein
the controller further includes a third bipolar transistor,
a collector of the first bipolar transistor is electrically connected to the light emitting element,
a collector of the second bipolar transistor is electrically connected to the base of the first bipolar transistor,
a collector of the third bipolar transistor is electrically connected to the base of the second bipolar transistor, and
a base of the third bipolar transistor is electrically connected between the anode of the Zener diode and the first resistor.

8. The device according to claim 7, wherein
the third bipolar transistor cooperates with the second bipolar transistor to control supply and cease of the current between the anode of the Zener diode and the first resistor for the base of the first bipolar transistor.

9. The device according to claim 7, further comprising:
a second resistor of which one end is electrically connected between a cathode of the Zener diode and an emitter of the first bipolar transistor, and an other end is electrically connected between the base of the second bipolar transistor and the collector of the third bipolar transistor.

10. The device according to claim 9, wherein
when an excessive voltage is applied to the vehicular lighting device, a current is supplied to the base of the third bipolar transistor via the Zener diode, and the third bipolar transistor is turned on.

11. The device according to claim 1, wherein
the socket contains a high thermal conductive resin.

12. The device according to claim 1, wherein
a plurality of the light emitting elements are provided, and the plurality of the light emitting elements are connected in series.

13. The device according to claim 1, wherein
a heat radiation fin is provided on an end side of the socket opposite to a side on which the substrate is provided.

14. The device according to claim 1, wherein
a plurality of bayonets are provided on a side surface of the socket.

15. A vehicular lamp, comprising:
the vehicular lighting device according to claim 1; and a housing to which the vehicular lighting device is attached.

\* \* \* \* \*